United States Patent [19]
Fujiwara et al.

[11] Patent Number: 6,014,655
[45] Date of Patent: Jan. 11, 2000

[54] METHOD OF RETRIEVING DATABASE

[75] Inventors: Shinji Fujiwara, Sagamihara; Kazutomo Ushijima, Kokubunji, both of Japan

[73] Assignee: Hitachi, Ltd., Tokyo, Japan

[21] Appl. No.: 08/816,524

[22] Filed: Mar. 13, 1997

[30] Foreign Application Priority Data

Mar. 13, 1996 [JP] Japan .................................. 8-055758

[51] Int. Cl.⁷ .................................................. G06F 17/30
[52] U.S. Cl. ........................................ 707/1; 707/2; 707/3
[58] Field of Search .................... 707/2, 3, 4, 5, 707/6, 1, 100

[56] References Cited

U.S. PATENT DOCUMENTS

| | | | |
|---|---|---|---|
| 5,548,758 | 8/1996 | Pirahesh et al. | 395/600 |
| 5,634,053 | 5/1997 | Noble et al. | 395/604 |
| 5,724,571 | 3/1998 | Woods | 395/605 |
| 5,752,017 | 5/1998 | Bhargava et al. | 707/2 |
| 5,787,422 | 7/1998 | Tukey et al. | 707/5 |
| 5,832,477 | 11/1998 | Bhargava et al. | 707/2 |

FOREIGN PATENT DOCUMENTS 08-6829   6/1996   Japan .

OTHER PUBLICATIONS

Sun et al. "Semantic Query Optimization for Tree and Chain Queries" IEEE Transactions on Knowledge and Data Engineering, vol. 6, No. 1, pp. 136–151, Feb. 1994.

Kim et al. "Tree Query Optimization in Distributed Object-Oriented Databases" IEEE, pp. 45–52, Apr. 1994.

Scheuermann et al. "A Deadlock Checkpointing Scheme for Multidatabase Systems" IEEE, pp. 184–191, Jul. 1992.

Chen et al. "Using Join Operations as Reducers in Distibuted Query Processing" IEEE, pp. 116–123, Jan. 1990.

Proceedings of the Twenty–Second International Conference on Very Large Data Bases, "The Design and Implementation of a Sequence Database System", P. Seshadri, et al., Mumbai (Bombay), India, Sep. 3–6, 1996.

*Primary Examiner*—Paul V. Kulik
*Assistant Examiner*—Michael J. Wallace, Jr.
*Attorney, Agent, or Firm*—Antonelli, Terry, Stout & Kraus, LLP

[57] ABSTRACT

A method, system and computer program for picking up and simultaneously executing common processings among a plurality of retrieval processings present in a series of queries so as to retrieve data from a database. The invention also provides a method, system and computer program for performing a query compiling. The invention performs a common scanning processing of data in the database while performing a judging operation according to retrieval conditions included in the retrieval processings of a query. Data judged to satisfy the retrieval conditions are set in output buffers and are transferred to the next processing nodes. Query-compiling is performed by detecting common processings from a query execution tree and transforming the common processings into a common scanning processing.

23 Claims, 12 Drawing Sheets

```
WITH Q1(QID,C1,C2,C3,D1,D2)
       AS (SELECT 'Q1', C1,C2,'0', SUM(D1), SUM(D2) FROM T1,T2
          WHERE T1. C1 = T2.C1 AND T2.D3 < 100 GROUP BY C1,C2)
     Q2(QID, C1,C2,C3,D1,D2)
       AS (SELECT 'Q2', '0', C2,C3, SUM(D1), SUM(D2) FROM T2,T3
          WHERE T2.C3 = T3.C3 AND T2.D4 < 100 GROUP BY C2,C3)
SELECT * FROM Q1 UNION ALL SELECT * FROM Q2
```

| MULTIPLEXING DEGREE | PRIOR METHOD | THIS INVENTION | PERFORMANCE RATIO |
|---|---|---|---|
| 1 | 316 | 316 | 1.00 |
| 2 | 631 | 369 | 1.71 |
| 3 | 947 | 422 | 2.25 |
| 4 | 1262 | 475 | 2.66 |
| 5 | 1578 | 528 | 2.99 |
| 10 | 3156 | 793 | 3.98 |
| 50 | 15778 | 2915 | 5.41 |
| 100 | 31555 | 5568 | 5.67 |

OCCURRENCE OF
DEADLOCK 1

OCCURRENCE OF
DEADLOCK 2

OCCURRENCE OF
DEADLOCK 3

DEADLOCK

DESCRIPTION OF SYMBOLS

TRANSFORM
PROCESSING 1

TRANSFORM
PROCESSING 2

DEADLOCK DETECTION
PROCESSING

SIMPLE DEADLOCK

DEADLOCK AMONG A
PLURALITY OF PROCESSINGS

DEADLOCK
DETECTION 1

DEADLOCK DETECTION 2

FIG. 13
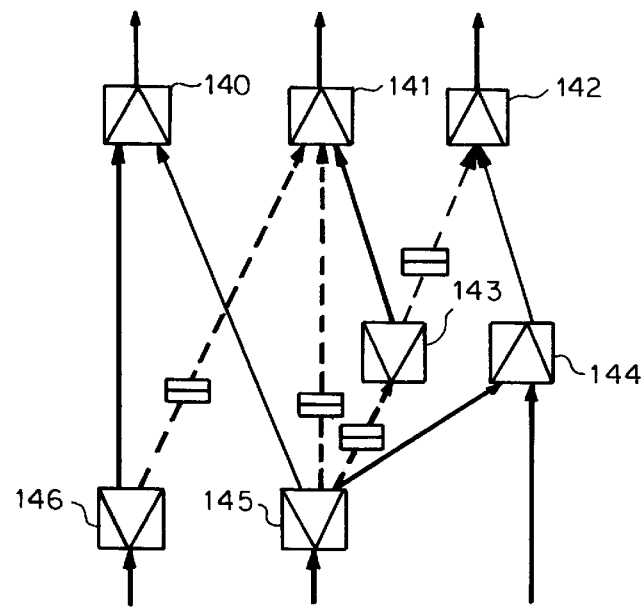
FIG. 14a
FIG. 14b
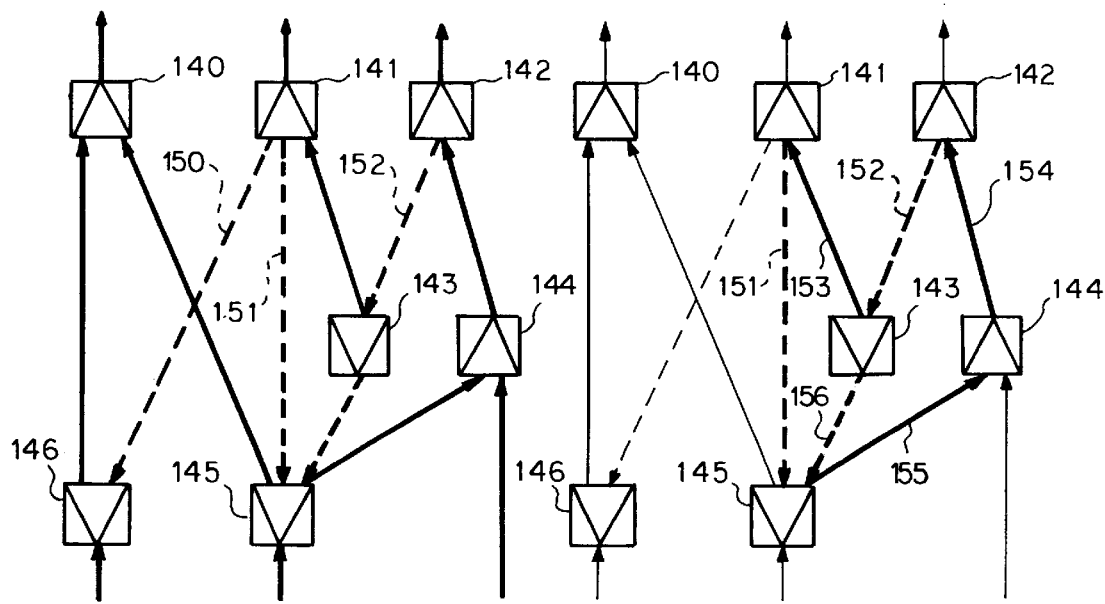
DEADLOCK DETECTION 1
DEADLOCK DETECTION 2

Q1: SELECT C1, C2, SUM(D1), SUM(D2) FROM T1, T2
    WHERE T1.C1 = T2.C1 AND T2.D3 < 100 GROUP BY C1, C2
Q2: SELECT C2, C3, SUM(D1), SUM(D2) FROM T2, T3
    WHERE T2.C3 AND T2.D4 < 100 GROUP BY C2, C3

METHOD OF RETRIEVING DATABASE

BACKGROUND OF THE INVENTION

The present invention relates to a database method, system and computer program for making reference to a table. More particularly, the present invention relates to a database retrieval processing method, system and computer program for simultaneously executing a plurality of retrieval processings.

A data warehouse is a practical way to make use of the expansion of the parallel server market for commercial applications. Typically, it is an enterprise data system of three hierarchical structures made up of an enterprise data warehouse for storing tremendous amounts of data, a section data warehouse for storing data picked up for each of the sections, and a number of client terminals.

In this data warehouse, a multidimensional analysis is frequently carried out in order to analyze a table of raw data from various angles. For this purpose, the retrieval is repetitively executed for a table under various conditions. In the database system, these retrievals have been executed separately. The data warehouse holds raw data in tremendously large amounts on a tera Byte (TB) scale, and extended periods of time are required for scanning the whole data. When the retrieval is repetitively executed under various conditions, therefore, the whole raw data must be scanned many times repetitively, requiring very long processing times.

FIG. 3 illustrates an SQL sentence of a query including a plurality of retrieval processings. FIG. 3 includes two retrieval processings Q1 and Q2 designated by a WITH phrase. In the retrieval processing Q1, a table T1 and a table T2 in which the column D3 is smaller than 100 are joined together with a column C1 as a key, the columns C1 and C2 form a group, and a total of the columns D1 and D2 is found for each of the groups. In the retrieval processing Q2, a table T2 in which the column D4 is smaller than 100 and a table T3 are joined together with the column C3 as a key, the columns C2 and C3 form a group, and a total of the columns D1 and D2 is found for each of the groups.

In the SQL of FIG. 3, the processings of Q1 and Q2 are rounded as a result of retrieval through UNION ALL. In this case, an identifier "Q1" and an identifier "Q2" are attached to the head to indicate whether the result is form the retrieval processing Q1 or the retrieval processing Q2. The SQL includes a processing for joining the tables T1 and T2 together to form a group, and a processing for joining the tables T2 and T3 together to form a group. When the query is executed according to a conventional system, the table T2 is scanned twice. FIG. 2 illustrates the flow of processing in this case.

FIG. 2 illustrates a case where tables T1, T2 and T3 stored in a plurality of secondary storage units 28 to 30 are read by a scan back-end server (Scan BES) 6, are transferred to join back-end servers (Join BES) 4 and 5 and are treated. The scan back-end server 6 has a database buffer 17 for caching the data read out from the secondary storage onto the main memory, and independently executes a total of four table scanning processings, i.e., table scanning processings 14 and 31 for joining the tables T1 and T2 together, and table scanning processings 32 and 16 for joining the tables T2 and T3 together.

In the processing of FIG. 2, the scanning processing of table T2 is executed twice in an overlapped manner. Therefore, the table scanning processing for taking the data from the database buffer must be executed twice in an overlapped manner. Moreover, when there is a difference in the processing speed between the T2 scanning processings 31 and 32, the database buffer 17 loses the cache effect of table T2 that is to be referred to by the scanning processings. In the worst case, the I/O processing for the secondary storage is issued twice.

In order to solve these problems according to the prior art, the simultaneous execution is carried out when the same data are to be accessed among a plurality of retrieval processings as disclosed in Japanese Patent Application No. 8-6829, so that the data taken in by the database buffer through one time of I/O can be utilized among the plurality of retrieval processings.

In the conventional simultaneous execution control system for a plurality of retrieval processings, it is necessary to execute the simultaneous control operation among the retrieval processings in order to heighten the hit rate of the database buffer. However, the queries are thrown into the database system out of synchronism, and a large overhead is required for controlling them in synchronism. Besides, when there is a difference in the rate for scanning the data among the retrieval processings, the data held in the database buffer cannot be used in common unless the synchronizing control operation is frequently executed.

In the conventional system, furthermore, the processing is commonly executed for reading the data from the secondary storage into the database buffer, but the processing for reading the data from the database buffer to a local buffer in each retrieval processing is executed for each of the retrieval processings. Therefore, the processing is not commonly carried out to a sufficient degree.

As means for commonly issuing a plurality of retrieval processings as a series of queries, there have been proposed a stored procedure of SQL and a WITH phrase standardized with SQL3. In the multidimensional analysis of data warehouse, a plurality of retrieval processings are issued simultaneously and can be rounded into a one time of query by a means which uses the stored procedure or the WITH phrase.

As apparatus for commonly issuing a plurality of retrieval processings as a series of queries, there can be further developed apparatus which buffers and commonly issues a plurality of SQL sentences in response to a query reception server of the database system in addition to the abovementioned apparatus.

A conventional system disclosed in "The Design and Implementation of a Sequence Database System" by P. Seshadri, et al., Proceedings of the 22nd VLDB Conference, September 1996, pages 99–110 arranges common retrieval processings into a single retrieval processing and executes a search with respect to the single retrieval. However, the disadvantage of this conventional system is that the search result is stored as a temporal list and the temporal list is later read repeatedly by the original retrieval processings.

SUMMARY OF THE INVENTION

The object of the present invention is to provide a method, system and computer program for efficiently executing a plurality of retrieval processings present in a series of queries.

Another object of the present invention is to provide a method, system and computer program for forming a query execution graph by compiling a series of queries constituted by a plurality of retrieval processings.

Yet another object of the present invention is to provide a method, system and computer program for detecting, at the time of compiling, the deadlock that occurs when a plurality of retrieval processings are simultaneously executed, and a method, system and computer program for breaking the deadlock.

An embodiment of the present invention deals with a processing method, system and computer program which, when a plurality of retrieval processings are to be executed for a table, rounds partial retrieval processings common among the plurality of retrieval processings into one and uses it in common among the plurality of retrieval processings. This processing method, system and computer program includes a step for analyzing a query including a plurality of retrieval processings to form a query execution graph, and a step for executing the retrieval processing according to the execution graph that is formed.

The step for analyzing the query to form a query execution graph includes a step for analyzing a plurality of retrieval processings included in the query to form an execution tree for each of the retrieval processings, a step for detecting processings which are common among the execution trees of the retrieval processings and for transforming the common processings into an execution graph that shares the common processings, and a step for analyzing the transformed execution graph to determine the possibility of a deadlock so that part of the partial graph can be separated to transform it into a deadlock-free execution graph.

The step for executing the retrieval processing has a common scanning step for executing a plurality of retrieval processings for the same table. The common scanning step is constituted by reading data into an input buffer that satisfy conditions common among a plurality of retrieval processings, and comparing the data to common retrieval conditions a plurality of times according to the retrieval processings and outputting the data which satisfies the retrieval conditions to a plurality of output buffers.

BRIEF DESCRIPTION OF THE DRAWINGS

The present invention will be more apparent from the following detailed description, when taken in conjunction with the accompanying drawings, in which:

FIG. 13 is a schematic diagram illustrating a complex query execution graph;

FIGS. 14A and 14B are schematic diagrams illustrating apparatus for detecting a complex deadlock in the query execution graph;

DETAILED DESCRIPTION OF THE INVENTION

It should be noted that the present invention can be implemented by a computer program written in, for example, "C" language and executed on a UNIX type server such as Sun Microsystems, Hewlett Packard or a Windows NT server. The computer program of the present invention can also be installed on a RAID server or the like and may be distributed to users via a network from storage included in a server connected to the network.

Figure 1:
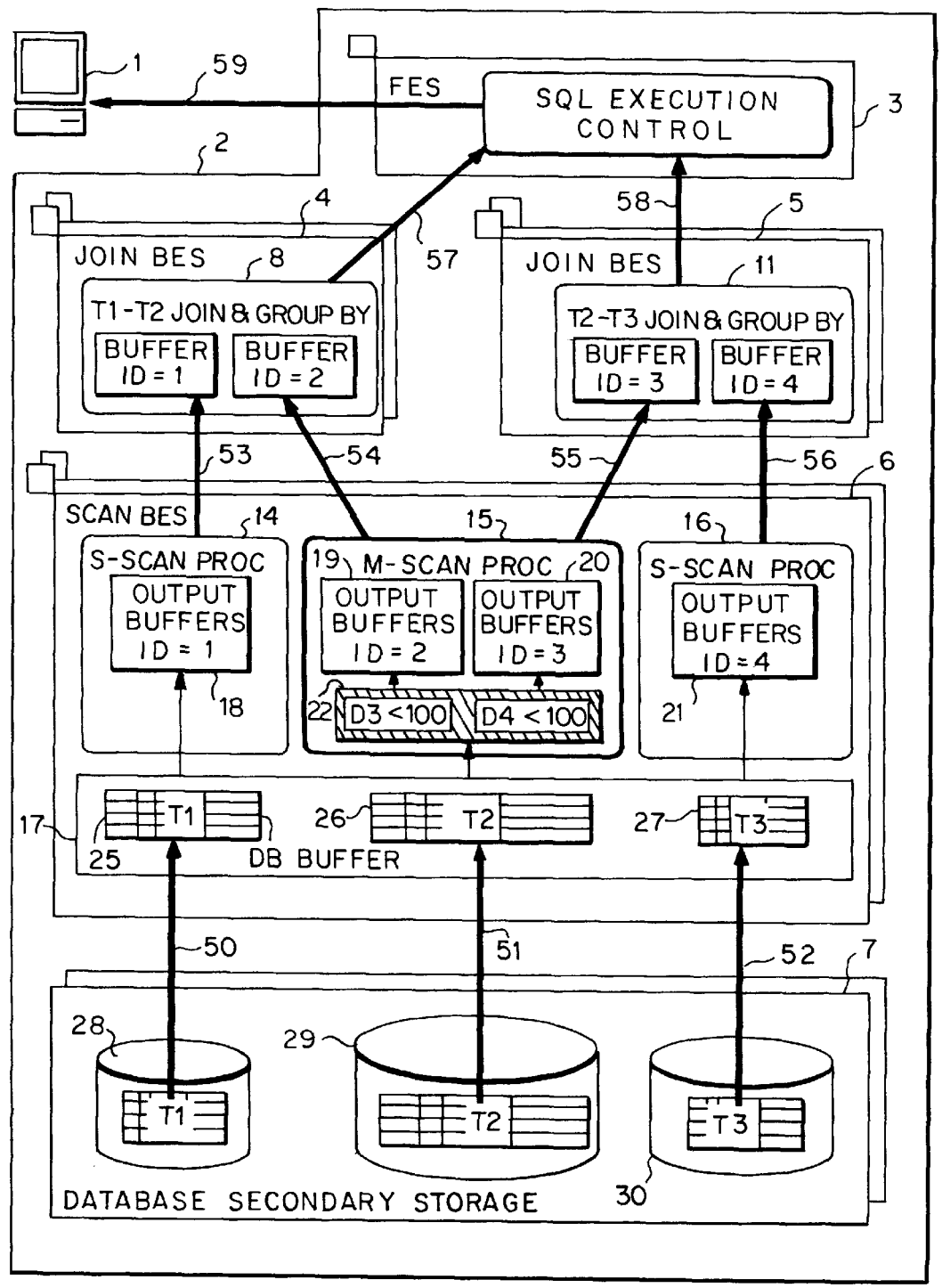
FIG. 1 is a schematic diagram illustrating the simultaneous execution of a plurality of retrieval processings according to the present invention.
Figures 2, 3:
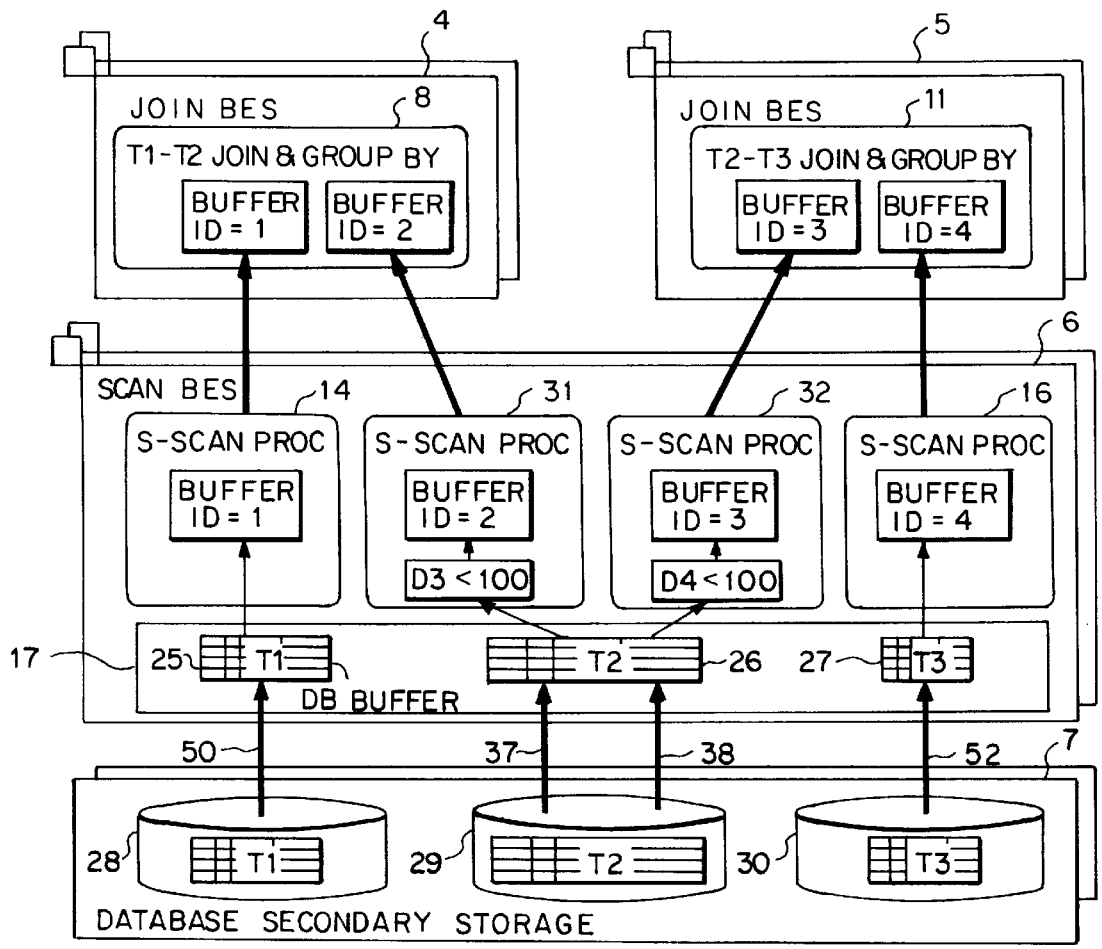
FIG. 2 is a schematic diagram illustrating a processing in a conventional system.
FIG. 3 is a schematic diagram illustrating an SQL sentence including a plurality of retrieval processings.
Figure 4:
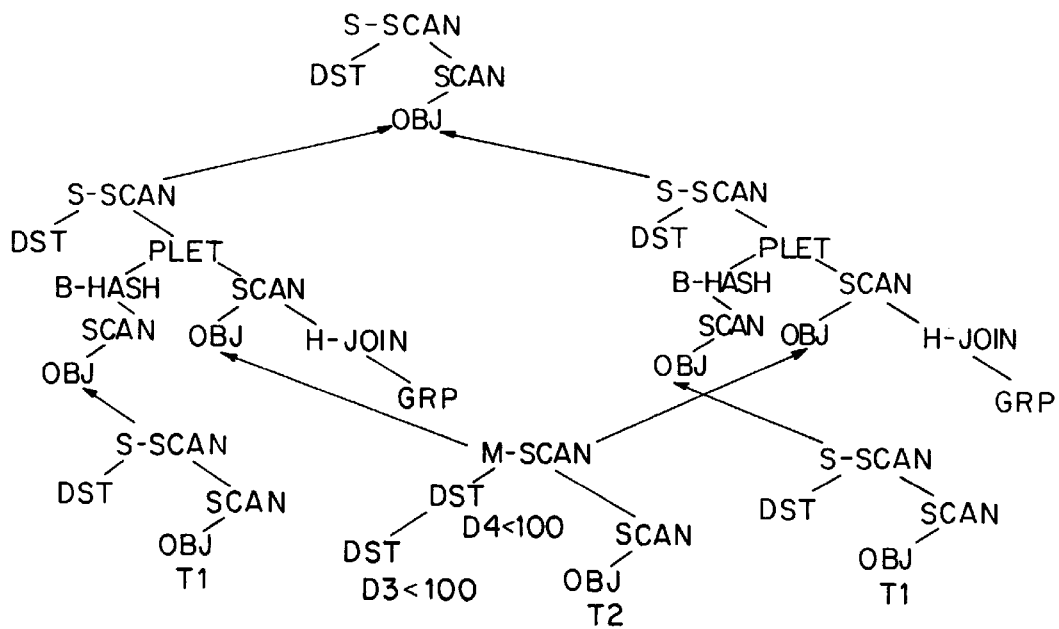
FIG. 4 is a schematic diagram illustrating a query execution graph.

FIG. 1 is a schematic diagram illustrating the simultaneous execution of a plurality of retrieval processings in a database for putting the present invention into practice. When a terminal 1 issues a query shown in FIG. 3 to a database system 2, a query receiving server (front-end server) 3 receives the query and compiles it. An execution graph of a retrieval processing is formed as a result of compiling, as illustrated in FIG. 4. The execution graph illustrated in FIG. 4 may be displayed to the user. Hereinafter, the description is based upon the retrieval processing illustrated in FIG. 4 being executed. After the compiling, a variety of back-end servers necessary for executing the next retrieval processing are started, and the execution of the retrieval processing is instructed. The retrieval execution graph illustrated in FIG. 4 includes two join operations and three table scanning processings. Therefore, join back-end servers 4, 5 and a scan back-end server 6 are driven.

The join back-end servers 4 and 5 execute a processing for effecting hash joining and grouping. The scan back-end server 6 performs a single scanning 14, 16 respectively for each of tables T1 or T3 while performing judgement operations according to a retrieval condition included in the respective retrieval processing. The scan back-end server 6 outputs the data judged to satisfy the respective retrieval conditions to destination join back-end servers 4 and 13. on the other hand, the scan back-end server 6 performs a common scanning processing 15 on the table T2 while performing a judging operation of retrieval conditions common to the retrieval processings. The scan back-end server 6 outputs data to a destination join back-end server corresponding to data which satisfies the common retrieval conditions. In this common scanning processing, the data read through one time of scanning processing are judged under common retrieval conditions of a plurality of retrieval processings.

In the single scanning processing 14 of table T1, the data of table T1 are read out from the secondary storage onto the DB buffer 17, the data are taken into the buffer of single scanning processing, and the processed data are output to the join back-end server. In the single scanning processing 16 of Table T3, the data of table T3 are read out from the secondary memory into the DB buffer 17 in the same manner as in the single scanning processing 14. The data are further taken into the buffer in the single scanning processing, and the processed data are output to the join back-end server.

In the common scanning processing 15 of table T2, the data of table T2 are read out from the secondary storage into the DB buffer. The data are further taken into the buffer of the common scanning processing, and the data taken in under the conditions corresponding to the respective join operations are judged a plurality of times 22. The data adapted to the conditions are stored in the corresponding output buffers through the common scanning processing, and are output to the respective join back-end servers. The data output from the scanning processings are not stored in the secondary storage but are successively processed by the join back-end server. The results of operation found by the join back-end server are successively output to the front-end server 3 and are, finally, output to a terminal 1 that has issued the query. According to this system as described above, there is no need to provide the secondary storage for handing over the data among the servers. Therefore, the processings can be executed in a pipeline manner when they are executed using independent control units.

In this embodiment, the data output from the processings are transferred to the input of the next processing. By using the input/output buffers in common, however, it is allowable to omit the transfer of data, as a matter of course. Further in this embodiment, a query including a plurality of retrieval processings is issued from a terminal. However, a plurality of retrieval processings can be rounded by a query receiving server. Even in this case, the system for simultaneously executing the retrieval processings according to the present invention can be applied.

Figure 5:
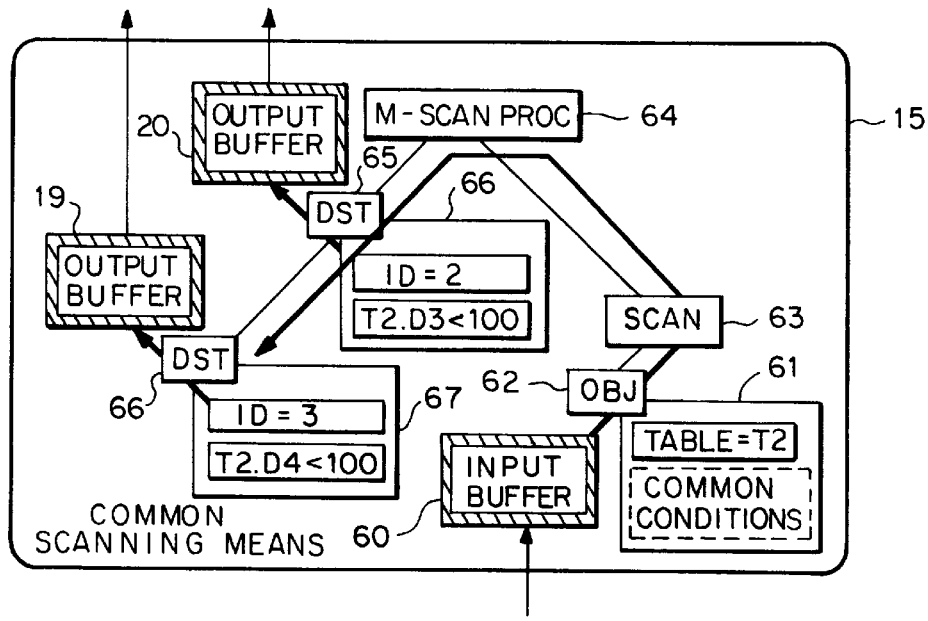
FIG. 5 is a schematic diagram illustrating, in detail, the flow of operations in a common scanning processing.

FIG. 5 is a diagram illustrating in detail the flow of operations of common scanning processing. The common scanning processing 15 executes a tree with a common scanning node (M-SCAN Proc) 64 as a root. The M-SCAN Proc node is allowed to possess a plurality of destination nodes (DST) 65 and 66 as a left sub-tree. The DST node in the common scanning processing can have an output identifier for discriminating the output and destination data (66 and 67) on which are described individual retrieval condition formulas indicating retrieval conditions for each DST.

In this embodiment, the output identifier at the DST node 65 is 2, output for the join back-end server 4 and the individual retrieval condition is T2.D3<100. At the DST node 66, the output identifier is 3, output for the join back-end server 5, and the individual retrieval condition is T2.D4<100. The data adapted to the individual retrieval conditions are output to the output buffers 19 and 20 possessed by the DST nodes, and are used as input data for the next processing. On the right sub-tree of the M-SCAN Proc node is described a processing which can be in common in the M-SCAN Proc. According to this embodiment, since the whole scanning processings of table T2 are used in common, a sub-tree for designating the execution is expressed by a SCAN node 63 and an OBJ node 62. On the OBJ node are described an input identifier and a common retrieval condition 61.

On the input identifier is described data for identifying the input source, such as whether the input source is a table of database or an output buffer of other servers. When the input source is a table, an identifier representing the table is described and when the input source is an output buffer, an output identifier representing the output buffer is described. In this embodiment, the input source is a table, and the table identifier is T2. On the other hand, the common retrieval condition for the OBJ node describes a common portion logical sum of the individual conditions to be narrowed by the common scanning processing. The individual retrieval conditions designated by the DST node describe conditions other than those that could not be narrowed by the common retrieval condition. For instance, when there are two destinations and their retrieval conditions are "100≦D1<200" and "200≦D1 <300", respectively, the common condition becomes "100≦D1<300" and the individual conditions become D1<200 and 200≦D1, respectively. In this embodiment, the common retrieval condition becomes the whole data of the table, and the common condition is not described.

Described below is the flow of data in the common scanning processing. The common scanning processing, first, reads the data according to an input identifier described on the OBJ node and takes the data adapted to the common condition into the input buffer 60. The data taken into the input buffer are collated with the individual retrieval conditions described in the output destination data 66 at the DST node 65 and are output to the output buffer 20 when they are in agreement with the retrieval conditions. The same processing is executed even at the next DST node 66, and the data in agreement with the individual retrieval conditions are output to the output buffer 19. According to the present invention, the data are output to a plurality of destinations for the data input of one time. Therefore, the data input processing is executed only one time, and the overhead can be decreased.

Figures 6, 7:
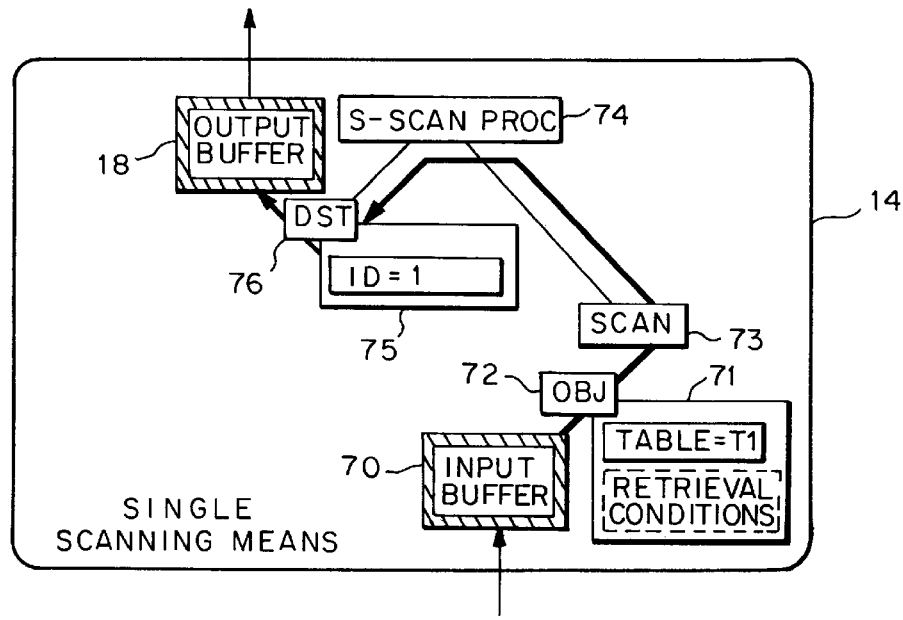
FIG. 6 is a schematic diagram illustrating, in detail, the flow of operations in a single scanning processing.
FIG. 7 is a schematic diagram illustrating a difference in the processing cost between the present invention and a conventional system.

FIG. 6 illustrates in detail the flow of operations in single scanning processing. The single scanning processing 14 executes a tree with a single scanning node (S-SCAN Proc) 74 as a root. The S-SCAN Proc node 74 is allowed to possess only one output destination node (DST) as a left sub-tree 76. The DST node in the single scanning processing has an output destination data 75 on which an output identifier is described. In this embodiment, the output identifier at the output destination node 75 is 1. In the common scanning processing, the individual retrieval condition formula is described on the output destination data. In the single scanning processing, on the other hand, the output destination is only one and the retrieval condition is described on the OBJ node 72, 71.

On the sub-tree on the right of the S-SCAN Proc node are described an input source of the data to be scanned, retrieval conditions, etc. In an example of FIG. 6, a tree for designating the execution of unconditional whole scanning processing of table T1 is expressed by a SCAN node 74 and an OBJ node 72. On the OBJ node are described an input identifier and retrieval conditions 71. On the input identifier are described data for identifying whether the input source is a table of database or an output buffer of other server. When the input source is the table, a table identifier is described and when the input source is the output buffer, the output identifier is described. In the example of FIG. 6, the input source is a table and the table identifier is T1. The retrieval condition at the OBJ node has nothing described thereon and is designating the whole scanning.

When the cost of input processing onto the DB buffer with a page as a unit is denoted by D-IN, the cost of narrowing under the selection conditions by bringing data of every line from the DB buffer to the scanning processing is denoted by D-FETCH, the cost of writing the hit data onto the output buffer is denoted by D-SET, the cost for outputting the data of the output buffer with a page as a unit is denoted by D-OUT, and the multiplexing degree of table scanning is denoted by N, i.e., the number of retrieval processings for a common processing is denoted by N, then, the cost of processing when a plurality of scannings for a table is executed by a single scanning node (S-SCAN Proc) only according to the conventional system:

$$(\text{D-IN} \times (\text{number of pages of table}) +$$
$$\text{D-FETCH} \times (\text{number of rows of table})) \times N +$$
$$(\text{D-SET} \times (\text{number of hits}) + \text{D-OUT} \times$$
$$(\text{number of pages of data of the results of scanning})) \times N$$

According to the method, system and computer program of this embodiment in which the former half processing is carried out in common, on the other hand, the cost of scanning the table becomes:, $$(\text{D-IN} \times (\text{number of papers of table}) +$$
$$\text{D-FETCH} \times (\text{number of rows of table})) \times 1 +$$
$$(\text{D-SET} \times (\text{number of hits}) + \text{D-OUT} \times$$
$$(\text{number of pages of data of the results of scanning})) \times N$$

If the ratio of processing cost of D-IN, D-FETCH, D-SET and D-OUT is 5:2:1:5, the recording length of table is 512 bytes, the number of records is 100,000 rows, the recording length of the scanned results is 50 bytes, the selection ratio of the scanning conditions is 50% and the page size is 4096 bytes, then, the results become as shown in FIG. 7 from which it will be understood that the processing cost can be reduced. When a table holding a large scale of raw data is to be multidimensionally analyzed, in general, the tremendous amounts of raw data are queried from various angles. By applying the, system and computer program of this embodiment, it is allowed to reduce the scanning processing for a large scale of data.

Figure 8:
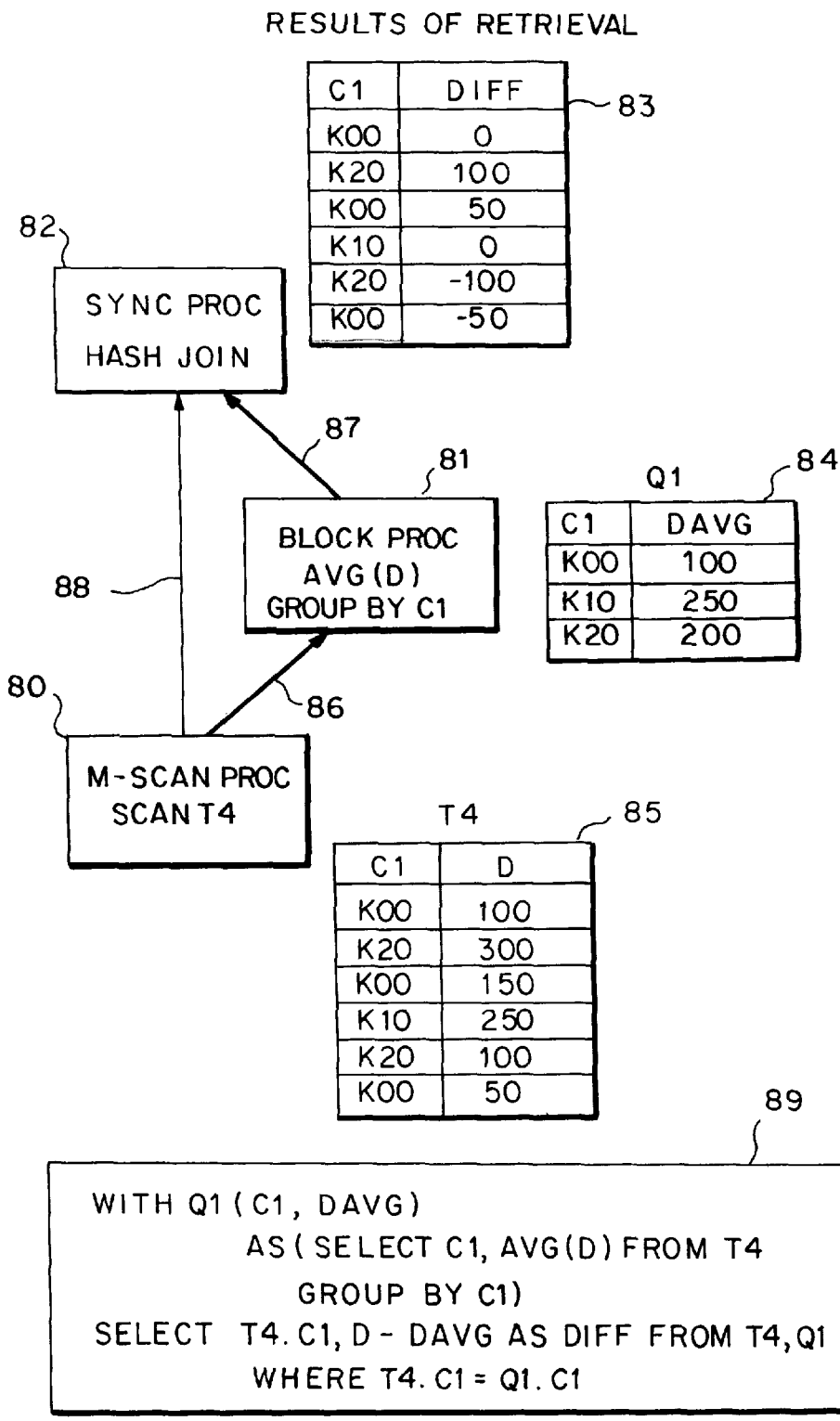
FIG. 8 is a schematic diagram illustrating a case where the deadlock occurs when a common scanning processing is employed.

From these results, a system can be developed for commonly effecting the table scanning processings that can be executed in common for all of the cases relying upon a common scanning processing. In practice, however, when the table scanning is effected in common, there exist queries giving rise to the occurrence of a deadlock in the retrieval processings. FIG. 8 illustrates an example of queries that develop a deadlock as the table scanning is effected in common. It is now presumed that a query is issued as designated at 89. In this query, the table T4 85 is grouped with a column C1, an average value of D is found for each of the groups and the intermediate result is denoted as Q1 84. Next, the table T4 and the intermediate result Q1 are joined together with the column C1 as a key, and a difference is found in the averages (DAVG) between D and D 82.

In this retrieval processing, the table T4 is scanned when Q1 is to be formed and when a join operation is to be executed. Therefore, the table T4 is scanned in common by M-SCAN Proc 80. The M-SCAN Proc 80 outputs the result to a processing node 81 which finds an average by grouping and to a node 82 which executes the join operation 86 and 88. The processing node that finds an average value by grouping outputs the result to the node 82 that executes the join operation 87. The node 81 that effects the grouping to find an average is not capable of outputting the result until the scanning is effected for all data in the table T4. The node which does not output the result unless the end of input data end of data is received, is called block processing node (Block Proc).

The node 82 that effects the joining inhibits the input of one data between the two input data unless the other one arrives. In this case, the input of data from the node 80 is inhibited so far as the data Q1 is not received from the node 81. The node that has a plurality of input data and inhibits the input of data depending upon the input state of the other data, is called a synchronized processing node (Sync Proc).

When the common scanning node, block processing node and synchronized processing node are joined maintaining a relation as shown in FIG. 8, the retrieval processing as a whole is deadlocked.

FIG. 9 is a diagram illustrating a process in which the retrieval processing shown in FIG. 8 is shifted to the deadlock. FIG. 9a illustrates a state immediately after the start of the retrieval processing. The data of the table T4 are read out by the input buffer 90 in the common scanning node 80 and are stored in the output buffers 91 and 92 for the next processing nodes. In FIG. 9B, the data are output from the output buffers 91 and 92 to the next processing nodes 82 and 81, and are stored in the respective input buffers 96 and 93. In FIG. 9c, the data that have arrived at the input buffer 93 for effecting the grouping and for finding an average value, are added onto a work buffer region 94. However, the data are not output to the output buffer 95 until the input data all arrive. Therefore, no data arrives at the input buffer 97 in the node 82 that effects the joining.

Figure 9A:
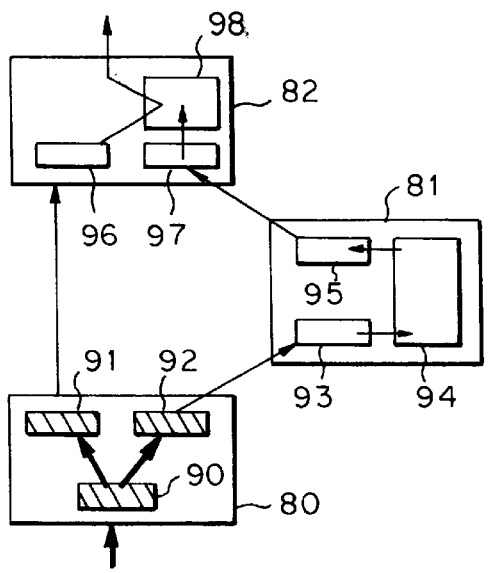
FIGS. 9A–9D are schematic diagrams illustrating a shift for falling into the deadlock.
Figure 9B:
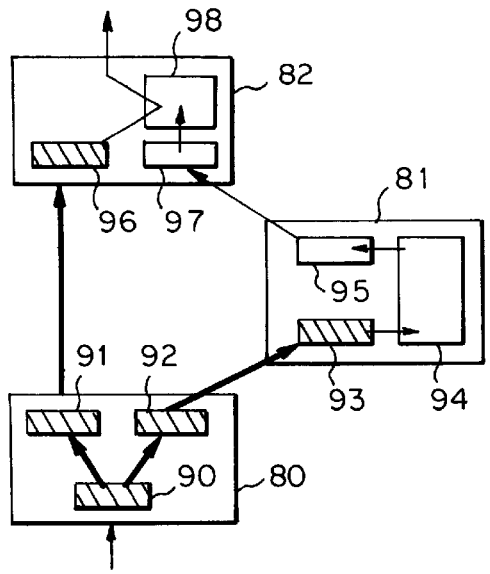
Figure 9C:
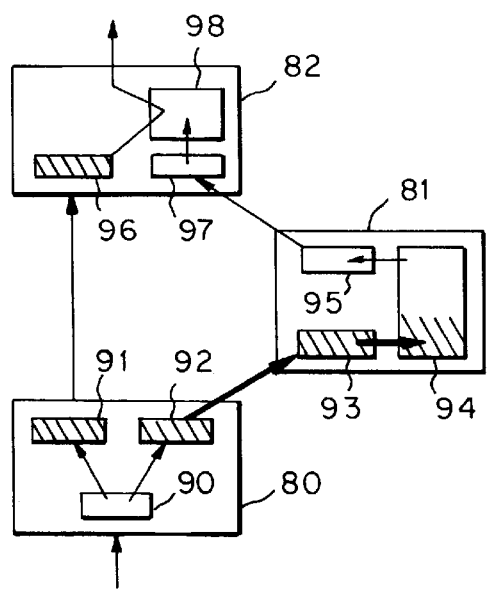
Figure 9D:
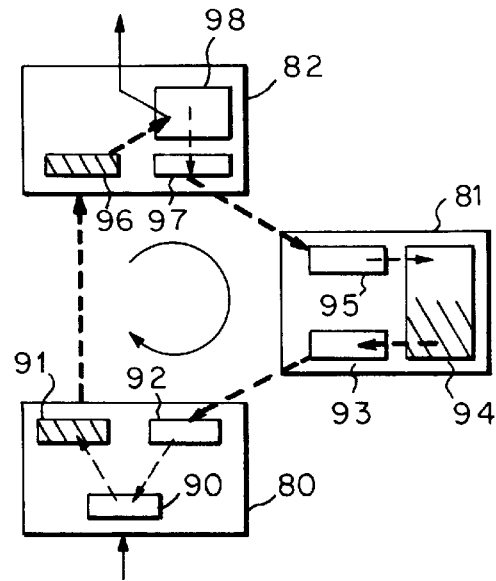

Then, a waiting state is established as shown in FIG. 9D and a deadlock occurs. That is, the data that have arrived at the input buffer 96 in the join node 82 are kept waiting in the buffer since a hash table 98 is unfinished. The hash table 98 cannot be formed since the data Q1 are not arriving at the input buffer 97. Since the data of the table T4 are not all arriving at the input buffer 93 in the node 81, the data Q1 are not totalized and are not output to the output node 95. The data of the table T4 cannot be read out since the output node 91 in the common scanning node 80 is full. The output node 91 cannot transmit the data since the input buffer 96 for executing the next joining is full. Thus, every node waits for each other.

Figure 10:
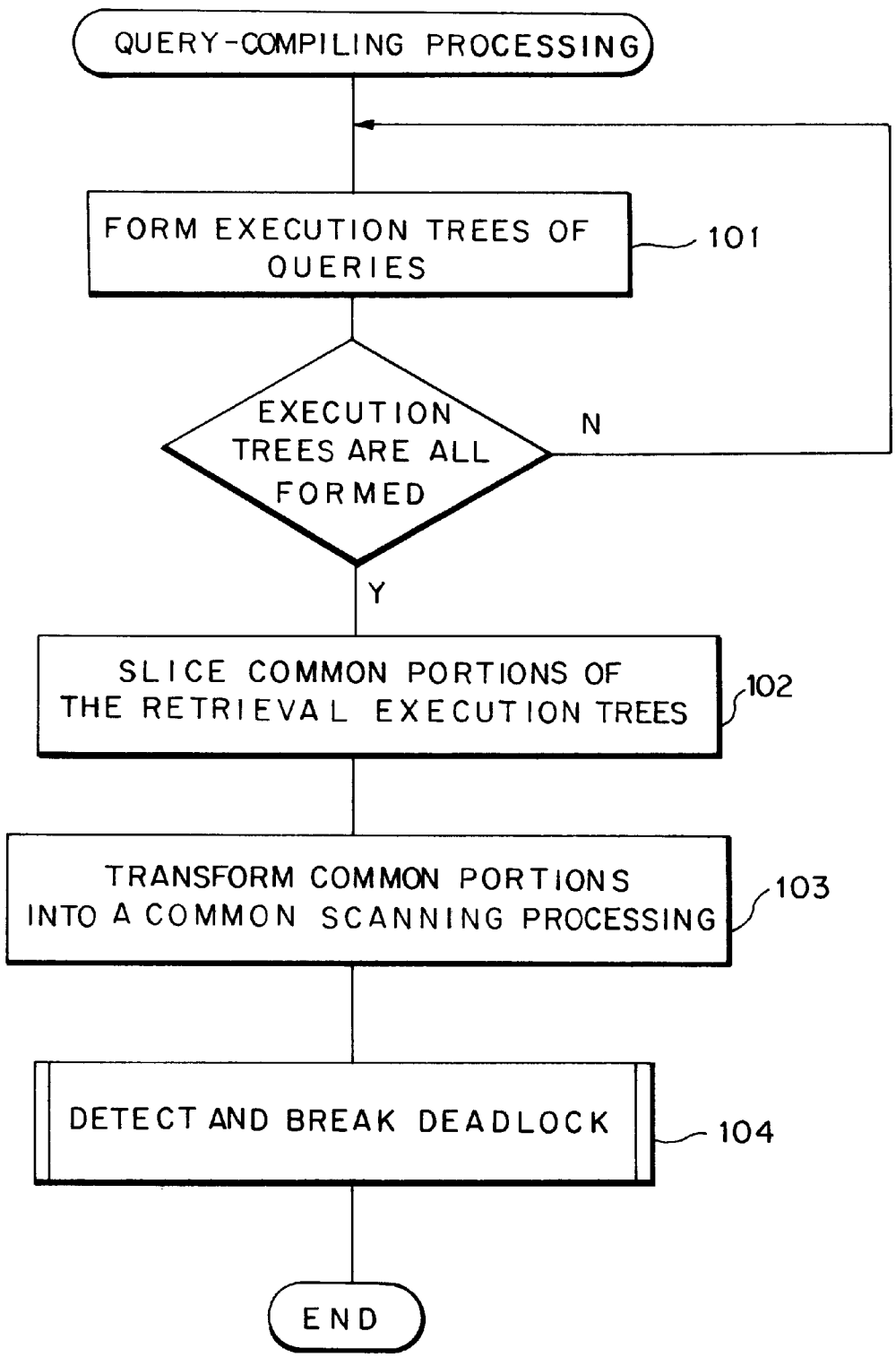
FIG. 10 is a flow chart of a processing for forming a query execution graph by compiling the queries.

To avoid such a state, it becomes necessary to detect whether the deadlock will occur or not when a query execution graph is formed in advance, and to no longer use, in common, part of the common scanning processing when it is likely that the deadlock may occur. FIG. 10 is a flow chart illustrating the processing performed to a method of form a query execution graph. In the query-compiling processing, an execution tree is formed for each of the retrievals included in the query. Then, common portions (common graphs) of the retrieval execution trees are sliced. The common graphs are taken out from the execution trees among a plurality of retrieval trees and for all of the cases in the same retrieval execution tree. The common graphs can be picked up by any method based upon transforming the graph structure in addition to a simple matching algorithm. The common graphs are picked up by neglecting differences in the conditions for narrowing the retrieval of the table.

Next, the common graphs that are picked up are transformed into a common scanning node. As for the retrieval processings having different narrowing conditions, in this case, the retrieval processings are executed in common depending upon the common retrieval conditions of the common scanning node and the individual retrieval conditions. Finally, the deadlock detection processing is executed for the query execution graph in which the common tree is transformed into a common scanning node. When the deadlock is detected, a copy of part of the common scanning node is formed to avoid the deadlock.

Figure 11:
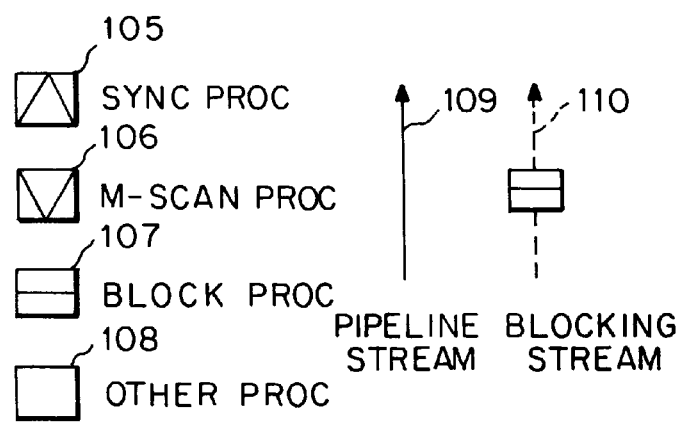
FIG. 11 is a schematic diagram for explaining apparatus for detecting a deadlock in the query execution graph.
Figure 11:
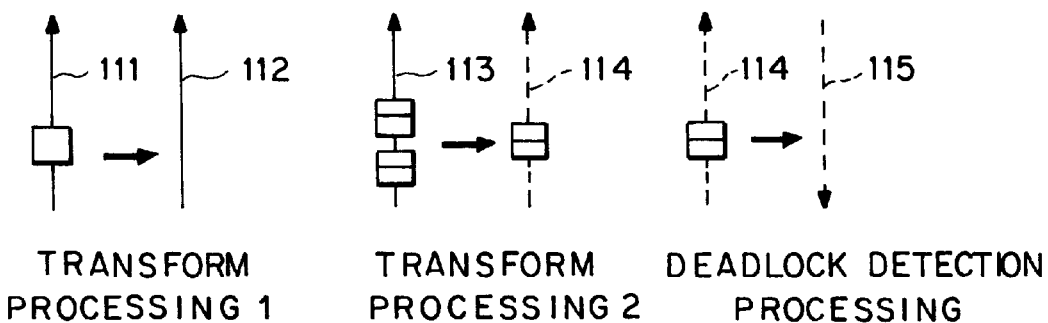

FIG. 11 is a diagram illustrating symbols used for explaining apparatus for detecting a deadlock. A figure denoted by 105 represents a synchronized processing node (Sync Proc) for executing the synchronized processing among a plurality of inputs, a figure denoted by 106 represents a common scanning node (M-SCAN Proc), and a figure denoted by 107 represents a block processing node (Block Proc) which does not output data until the data on the input side are all read out. An ordinary pipeline processing node that can be executed in a pipeline manner is represented by a figure denoted by 108. A directed line is attached to the query execution graph along the flow of data. According to the present invention, a feature resides in that the flow of data from the common scanning node to the synchronized processing node in the query execution graph is discriminated into two kinds of streams, i.e., a pipeline stream 109 and a blocking stream 110, in order to detect the deadlock. The pipeline stream is a data stream in which there is no block processing node on the way from the common scanning processing node to the synchronized processing node. The blocking stream is a data stream in which there is a blocking processing node on the way from the common scanning node to the synchronized processing node.

The transform processing 1 and 2 in FIG. 11 illustrates the transforming of a retrieval graph into a simple one in order to find a pipeline stream and a blocking stream. Transform processing 1 has a transform processing for removing ordinary processing nodes and for short-circuiting input and output. Transform processing 2 is a transform processing for rounding a plurality of continuous block processing nodes into one. By applying these transforms to the query execution graph, all routes from the common scanning node to the synchronized processing node can be grouped into either the directly joined one or the one that includes a block processing node. In this case, the route that is directly connected is regarded to be a pipeline stream and the route that is connected via a block processing node is regarded to be a block stream. In transform processing 2 the blocking stream is represented by a dotted directed line for easy explanation.

The deadlock detection processing is a processing for removing the block processing node by inverting the direction of arrow of the block stream in order to detect the deadlock. In the present invention, a feature resides in that the deadlock of the query execution graph is detected by detecting a loop by inverting the direction of the directed line of the block stream.

Figure 12A:
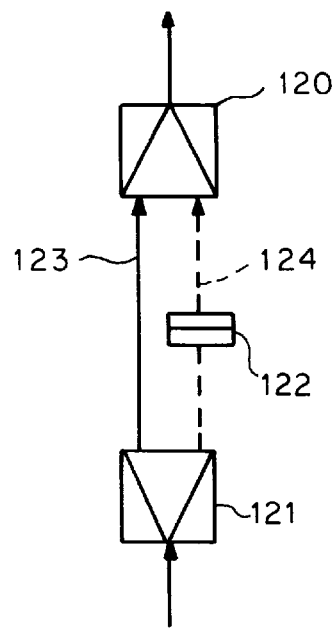
FIGS. 12A–12D are a schematic diagrams illustrating a simple procedure for detecting a deadlock.

FIGS. 12A–12D illustrates simple examples in which the query execution graph formed by the transformation into the common scanning node is in deadlock. FIG. 12a is a graph illustrating the simplest deadlock. This is a query execution graph formed at the time of executing the retrieval processing shown in FIG. 8, and wherein reference numeral 120 denotes Sync Proc 82 of FIG. 8, reference numeral 121 denotes M-SCAN Proc 80 of FIG. 8, and reference numeral 122 denotes Block Proc 81 of FIG. 8.

Figure 12B:
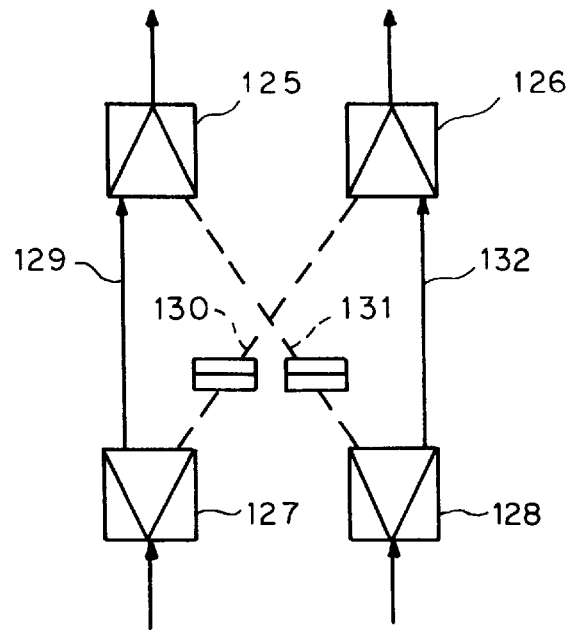
Figure 12C:
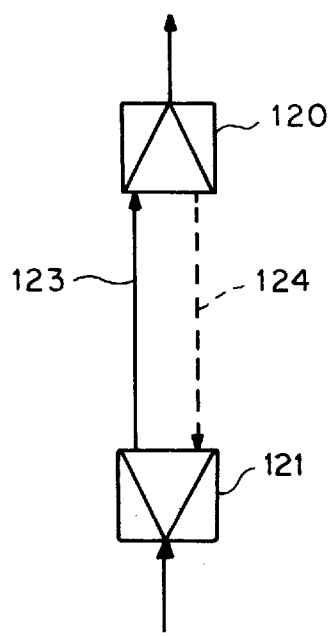

FIG. 12C is a graph in which the direction of arrow of the blocking stream is inverted relying upon the deadlock detection procedure shown in the deadlock detection processing FIG. 11 in order to detect whether the graph is in deadlock. It will then be understood that a loop is formed by the nodes 120, 121 and by the directed lines 123, 124. According to the present invention, the deadlock is detected by detecting whether the query execution graph has a loop or not. As for detecting the loop that exists in the graph, any method can be employed as proposed by graph theory, etc.

Figure 12D:
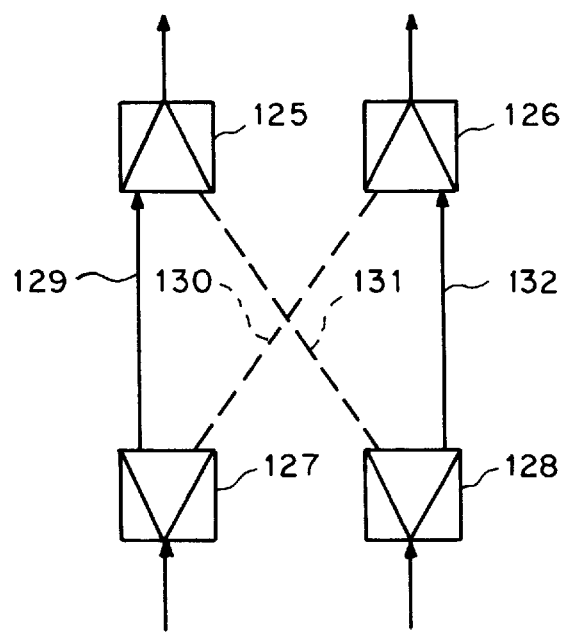

FIG. 12B is a diagram illustrating the deadlock among a plurality of retrieval processings. In this example, the query execution graph having a node 125 or 126 as a route does not by itself fall into the deadlock but falls into the deadlock when the common scanning processing is executed at the nodes 127 and 128. This is because, the pipeline streams 129 and 132 are blocked being affected by the block streams 130 and 131, and the common scanning nodes 127 and 128 are blocked. Even such a deadlock among a plurality of retrieval processings can be easily detected relying upon the deadlock detection procedure of the present invention. That is, as shown in FIG. 12d, if the direction of arrow of the blocking stream is inverted as shown in FIG. 12d, a loop of a transverse figure eight is formed by the directed lines 129, 131, 132 and 130. The deadlock can be easily detected by detecting the loop of the graph.

FIG. 13 is a diagram illustrating a complex query execution graph after the transform processings 1 and 2 are executed. This query execution graph includes three common scanning nodes (146, 145, 143), four synchronized processing nodes (140, 141, 142, 144), and four block processing nodes. FIGS. 14a and 14b are diagrams illustrating a procedure for detecting the deadlock in the query execution processing of FIG. 13. FIG. 14a is a diagram illustrating the state after the processing for inverting the arrow of the blocking stream shown in FIG. 11 is executed for the query execution graph. Due to this processing, the directions of arrows of the blocking streams 150, 151 and 152 are inverted. Next, when the loop detection processing is adapted to this graph, the two loops are detected as shown in FIG. 14b. That is, there are detected a first loop represented by the directed lines 152, 156, 155 and 154, and a second loop represented by the directed lines 151, 155, 154, 152 and 153. It will then be understood that the query execution graph is in deadlock.

Figure 15:
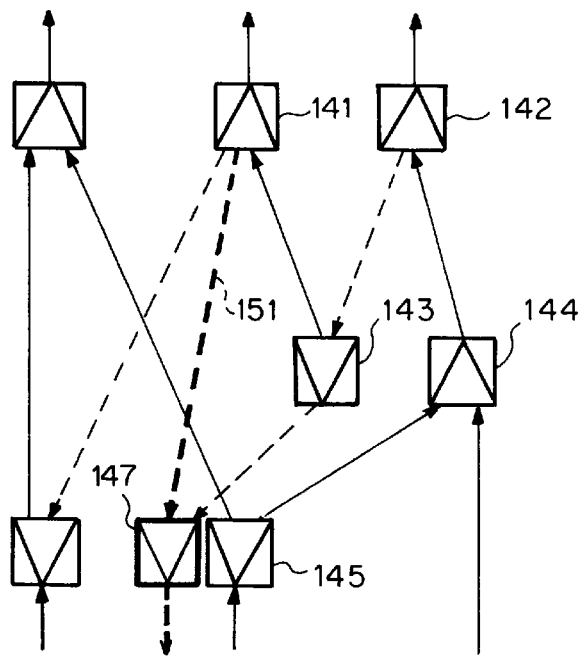
FIG. 15 is a schematic diagram illustrating a processing for breaking complex deadlock in the query execution graph.

FIG. 15 is a diagram illustrating a processing for avoiding the deadlock in the query execution graph. To break the deadlock, the deadlocking loop should be cut. For this purpose, part of the common scanning node included in the loop is copied, and the pipeline stream and the blocking stream output from the common scanning node are executed by separate scanning nodes. In this embodiment, a scanning node 147 is formed by copying the common scanning node 145, and all blocking streams 151 in this embodiment output from the common scanning processing 145 are assigned thereto. The remaining pipeline streams are all assigned to the original common scanning node 145.

To break the deadlock, the loop formed by a copy of the common scanning processing node is cut until the loops of the query execution graph are all cut. In this embodiment, if the common scanning processing node 145 is copied, the first loop and the second loop extinguish simultaneously. Therefore, the common scanning processing 145 is not copied any more.

Figure 16:
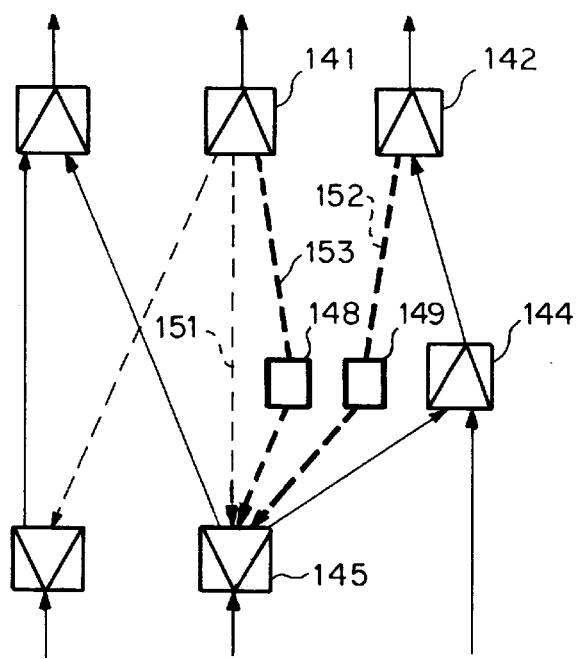
FIG. 16 is a schematic diagram illustrating a case where the loop cannot be extinguished by copying the common scanning node.

In this embodiment, the common scanning nodes falling into the deadlock include the node 143 in addition to the node 145. FIG. 16 illustrates a case where it is attempted to cut the loop by copying the node 143. The common scanning node 143 has only one blocking stream 152 and only one pipeline stream 153, and, hence, turns into single scanning nodes 148 and 149 upon being copied. Then, though the above-mentioned second loop temporarily extinguishes, and the first loop remains without being cut. Thus, the common scanning nodes are copied and bundled. Depending upon the common scanning node that is selected, the loop can be cut or cannot be cut. When the loop cannot be cut by copying the common scanning node one time, another common scanning node is further copied repetitively in order to cut the loop in deadlock.

When the performance of the retrieval execution is taken into consideration, however, it is desired that the loop in deadlock is cut by copying the common scanning node a number of times which is as small as possible. According to the present invention, a feature further resides in a method of selecting a candidate of a common scanning node which is capable of cutting the loop through the copying of a small number of times.

As a candidate of a common scanning node that is to be copied for cutting the loop of the query execution graph, there is selected a common scanning node on the upstream of the stream among the nodes falling into the deadlock loop. In this embodiment, the common scanning processing node falling in the deadlock loop were the nodes 143 and 145. Here, however, since the output of the node 145 is input to the node 143, the node 145 serves as an upstream node. Therefore, the node 145 is copied, and the processing is executed to avoid the deadlock. This processing is repetitively effected until the loop of the query execution graph extinguishes.

In executing the processing for breaking the deadlock, the loop can be extinguished if at least the common scanning nodes are all copied on the query execution graph. The number of the common scanning nodes included in the query execution graph is finite, and it can be guaranteed that the method of avoiding the deadlock terminates within a finite number of times. In this embodiment, the processing for detecting/breaking the deadlock is effected by inverting the directions of arrows of directed lines of the blocking stream. Essentially, however, the deadlock loop needs be detected and the loop needs be cut. Therefore, the deadlock can be detected and avoided quite in the same manner even when the directions of the directed lines of the pipeline stream are inverted.

Figure 17:
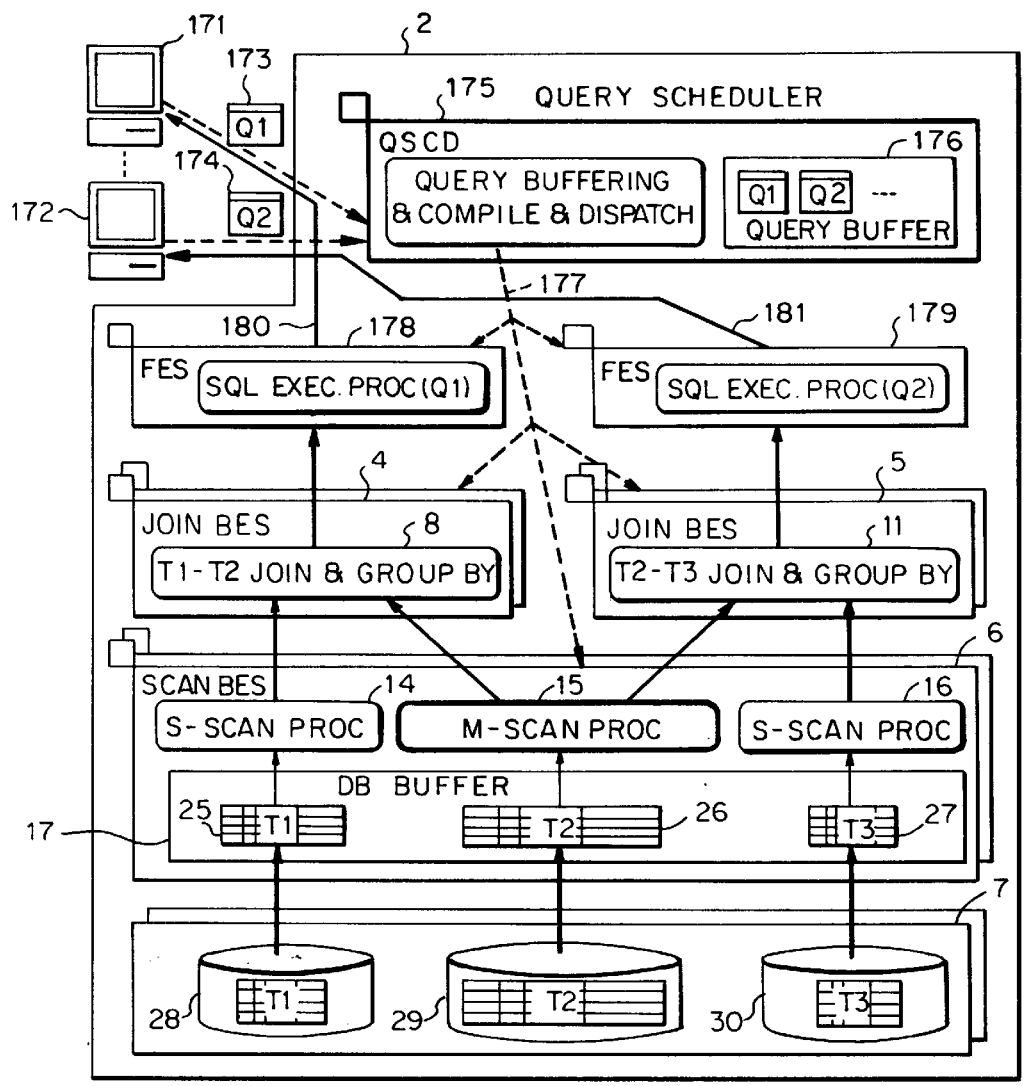
FIG. 17 is a schematic diagram illustrating the concurrent execution of a plurality of queries that are issued on a plurality of client terminals.

In the above embodiment, a processing method is disclosed that executes one query including plural retrieval processings. However, it is allowable when plural queries that access the same data are issued concurrently. FIG. 17 is a schematic diagram illustrating the concurrent execution of two queries Q1 and Q2 that are issued on the client terminals 171 and 172, concurrently. The query Q1 issued on the terminal 171 joins table T1 and table T2 whose column D3 is less than 100 with a column C2 as a key, the columns C1 and C2 form a group, and oral of the columns D1 and D2 is found for each of the groups. The query W2 issued on the terminal 172 joins table T3 and table T2 whose column D4 is less than 100 with a column C3 as a key, the columns C2 and C3 form a group, and oral of the columns D1 and D2 is found for each of the groups. In this embodiment, each query request issued on the terminal is sent to the query scheduler (QSCD). Then it is stored in the query buffer 176 in the QSCD. The QSCD compiles the queries that are stored in the query buffer and slices the common portion of the query execution graphs of these queries, and make the query graph that shares the common portion of the query execution graph. The former method mentioned above is applied to the compiling method that generates the query execution graph including the common portion.

In this embodiment, the query execution sub-trees generated by the QSCD are dispatched to the front-end serves 178 and 179, the join back-end servers 4 and 5, and the scan back-end server 6. In the above embodiment, there is only one front-end server for accepting the query request. In this embodiment, however, there are plural front-end servers to handle the queries issued on the plural client terminals simultaneously. Each retrieval result of the query is returned from the front-end server to the corresponding terminal (180 and 181). In this embodiment, the simultaneous execution of a plurality of retrieval processings is implemented by the query buffering facility of the QSCD. An interval timer and other interruption mechanisms based on the states of the database system are applicable to the trigger for the collection and compilation of the queries stored in the query buffer.

By executing the retrieval processings in common according to the present invention, it becomes possible to simultaneously execute a plurality of retrieval processings in the database system. Moreover, the present invention provides apparatus for detecting and avoiding the deadlock in advance, that becomes a problem as the retrieval processings are executed in common, eliminating the need to detect the deadlock at the time of executing the retrieval processings. The invention further provides a method of breaking the deadlock by copying a common scanning node a decreased number of times, making it possible to shorten the time for executing the retrieval.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of executing a plurality of retrieval processings to retrieve data from a database, said retrieval processings being included in a query, said method comprising the steps of:

scanning data in said database while performing a first judging operation according to at least a common retrieval condition included in each of the retrieval processings of the query;

performing a second judging operation according to retrieval conditions other than the at least common retrieval condition included in the retrieval processings of the query based on a result of said first judging operation; and setting data to a plurality of output buffers judged by said second judging operation to satisfy the other retrieval conditions included in the retrieval processings of the query.

2. A method according to claim 1, further comprising the step of:

transferring the set data from said output buffers so that processings can be performed on the set data.

3. A method according to claim 1, wherein said scanning step comprises the step of:

identifying data which satisfies the retrieval conditions included in the retrieval processings.

4. A query compiling method for forming a query execution graph for executing a plurality of retrieval processings present in a series of queries of a database, said query compiling method comprising the steps of:

forming a retrieval execution tree of the retrieval processings;

detecting processings which are common among the retrieval processings;

transforming the common processings into a processing for scanning data in said database while performing a first judging operation according to at least a common retrieval condition of each of the common processings;

performing a second judging operation according to retrieval conditions other than the at least common retrieval condition included in the common processings based on a result of said first judging operation;

detecting a deadlock of the transformed common processings; and breaking the detected deadlock.

5. A query compiling method for forming a query execution graph for executing a plurality of retrieval processings present in a series of queries of a database, said query compiling method comprising the steps of:

forming a retrieval execution tree of the retrieval processings;

detecting processings which are common among the retrieval processings;

transforming the common processings into a processing for scanning data in said database while performing a judging operation according to retrieval conditions of the common processings;

detecting a deadlock of the transformed common processings; and breaking the detected deadlock, wherein said detecting step comprises the steps of:

discriminating each node of the retrieval execution graph into one of a common scanning node for outputting data to a plurality of nodes, a synchronized processing node for inputting data from a plurality of nodes and for processing the data maintaining synchronism, a block processing node which does not output data until the input data are all read out, and a pipeline processing node other than said common scanning node, said synchronized processing node, said block processing node and said pipeline processing node, removing the pipeline processing node by short-circuiting an input and output of the pipeline processing node so as to simplify the retrieval execution graph by rounding a plurality of continuous block processing nodes into a block processing node, discriminating a route between two nodes, namely a route from the common scanning node to the synchronized processing node, into a pipeline stream that directly connects said two nodes and a blocking stream that connects said two nodes through a block processing node;

inverting a direction of an arrow of a directed line that expresses either said pipeline stream or said blocking stream in the query execution graph, and detecting a loop in the query execution graph in which the direction of said arrow is inverted.

6. A query compiling method according to claim 5, wherein said breaking step comprises the steps of:

selecting a common scanning processing node that belongs to a loop of the query execution graph detected by the step for detecting the deadlock;

forming copies of the selected common scanning processing for assigning them to separate scanning nodes for each of the pipeline stream and the blocking stream output from the selected common scanning node;

transforming the common scanning node into a single scanning node when only one stream is output from the assigned scanning node;

providing a new query execution graph formed by the transformation step and performing a step for detecting a deadlock; and returning to the step for selecting one of the common scanning nodes when a deadlock loop is detected by the step for detecting a deadlock and ending the step for breaking a deadlock when a deadlock loop is not detected.

7. A query compiling method according to claim 6, wherein a selecting step selects a common scanning node on the upstream side of the data flow when there exists a plurality of common scanning nodes.

8. A method of retrieving data from a database, comprising the steps of:

forming a query execution graph for executing a plurality of retrieval processings present in a series of queries, said forming step comprises the steps of:

forming a retrieval execution tree of retrieval processings, detecting processings which are common among the retrieval processings, transforming the common processings into a processing for scanning data in said database while performing a judging operation according to retrieval conditions of the common processings, detecting a deadlock of said transformed query execution graph, and breaking the detected deadlock; and retrieving data from a database by executing a plurality of retrieval processings present in said series of queries, said retrieving step comprises the steps of:

scanning data in said database while performing a judging operation according to common retrieval conditions included in a plurality of retrieval processings, and setting data to a plurality of output buffers judged by said judging operation to satisfy the common retrieval conditions.

9. A method according to claim 8, wherein said retrieving step further comprises the step of:

transferring the set data from said output buffers so that processing can be performed in the set data.

10. A database retrieval system for retrieving data from a database comprising:

a front-end server for receiving a series of queries of the database and compiling each of the queries by forming a query execution graph for said query;

a plurality of join back-end servers for joining and grouping data retrieved from the database according to the query execution graph; and a scan back-end server for retrieving data from the database by scanning data in the database according to the query execution graph, wherein said scan back-end server performs a single scanning processing of data in the database while performing a judgment operation according to a retrieval condition included in a retrieval processing when said retrieval condition included in the retrieval processing is not common to any other retrieval condition and supplies data which satisfies the retrieval condition to the join back-end servers, and wherein said scan back-end server performs a common scanning processing of data in the database while performing a judging operation according to retrieval conditions included in a plurality of retrieval processings when said retrieval conditions included in the retrieval processings are common to each other.

11. A database retrieval system according to claim 10, wherein said scan back-end server comprises:

a database buffer for temporarily storing data to be scanned from the database.

12. A database retrieval system according to claim 11, wherein said scan back-end server comprises:

a plurality of output buffers corresponding to said scanning processings for temporarily storing data which satisfy the retrieval conditions of said retrieval processings.

13. A database retrieval system according to claim 12, wherein said data temporarily stored in each of the said output buffers are supplied to said join back-end servers as retrieved data.

14. A database retrieval system according to claim 10, wherein said front-end server comprises:

a query buffer for temporarily storing said series of queries.

15. A computer program stored on a storage medium for execution by a computer to cause said computer to execute a plurality of retrieval processings to retrieve data from a database, said retrieval processings being included in a query, said computer program comprising the steps of:

scanning data in said database while performing a first judging operation according to at least a common retrieval condition included in each of the retrieval processings of the query;

performing a second judging operation according to retrieval conditions other than the at least common retrieval condition included in the retrieval processings of the query based on a result of said first judging operation; and setting data to a plurality of output buffers judged by said second judging operation to satisfy the other retrieval conditions included in the retrieval processings of the query.

16. A computer program according to claim 15, further comprising the step of:

transferring the set data from said output buffers so that processings can be performed on the set data.

17. A computer program stored on a storage medium for execution by a computer to cause said computer to according to claim 15, wherein said scanning step comprises the step of:

identifying data which satisfies the retrieval conditions included in the retrieval processings.

18. A computer program stored on a storage medium for execution by a computer to cause said computer to compiling a query by forming a query execution graph for executing a plurality of retrieval processings present in a series of queries of a database, said computer program comprising the steps of:

forming a retrieval execution tree of the retrieval processings;

detecting processings which are common among the retrieval processings;

transforming the common processings into a processing for scanning data in said database while performing a first judging operation according to at least a common retrieval condition of each of the common processings;

performing a second judging operation according to retrieval conditions other than the at least common retrieval condition included in the common processings based on a result of said first judging operation;

detecting a deadlock of the transformed common processings; and breaking the detected deadlock.

19. A computer program stored on a storage medium for execution by a computer to cause said computer to compiling a query by forming a query execution graph for executing a plurality of retrieval processings present in a series of queries of a database, said computer program comprising the steps of:

forming a retrieval execution tree of the retrieval processings;

detecting processings which are common among the retrieval processings;

transforming the common processings into a processing for scanning data in said database while performing a judging operation according to retrieval conditions of the common processings;

detecting a deadlock of the transformed common processings; and breaking the detected deadlock, wherein said detecting step comprises the steps of:

discriminating each node of the retrieval execution graph into one of a common scanning node for outputting data to a plurality of nodes, a synchronized processing node for inputting data from a plurality of nodes and for processing the data maintaining synchronism, a block processing node which does not output data until the input data are all read out, and a pipeline processing node other than said common scanning node, said synchronized processing node, said block processing node and said pipeline processing node, removing the pipeline processing node by short-circuiting an input and output of the pipeline processing node so as to simplify the retrieval execution graph by rounding a plurality of continuous block processing nodes into a block processing node, discriminating a route between two nodes, namely a route from the common scanning node to the synchronized processing node, into a pipeline stream that directly connects said two nodes and a blocking stream that connects said two nodes through a block processing node, inverting a direction of an arrow of a directed line that expresses either said pipeline stream or said blocking stream in the query execution graph, and detecting a loop in the query execution graph in which the direction of said arrow is inverted.

20. A computer program according to claim 19, wherein said breaking step comprises the steps of:

selecting a common scanning processing node that belongs to a loop of the query execution graph detected by the step for detecting the deadlock;

forming copies of the selected common scanning processing for assigning them to separate scanning nodes for each of the pipeline stream and the blocking stream output from the selected common scanning node;

transforming the common scanning node into a single scanning node when only one stream is output from the assigned scanning node;

providing a new query execution graph formed by the transformation step and performing a step for detecting a deadlock; and returning to the step for selecting one of the common scanning nodes when a deadlock loop is detected by the step for detecting a deadlock and ending the step for breaking a deadlock when a deadlock loop is not detected.

21. A computer program according to claim 20, wherein a selecting step selects a common scanning node on the upstream side of the data flow when there exists a plurality of common scanning nodes.

22. A computer program stored on a storage medium for execution by a computer to cause said computer to retrieve data from a database, said computer program comprising the steps of:

forming a query execution graph for executing a plurality of retrieval processings present in a series of queries, said forming step comprises the steps of:

forming a retrieval execution tree of retrieval processings, detecting processings which are common among the retrtransformings, transforming the common processings into a processing for scanning data in said database while performing a judging operation according to retrieval conditions of the common processings, detecting a deadlock of said transformed query execution graph, and breaking the detected deadlock; and retrieving data from a database by executing a plurality of retrieval processings present in said series of queries, said retrieving step comprises the steps of:

scanning data in said database while performing a judging operation according to common retrieval conditions included in a plurality of retrieval processings, and setting data to a plurality of output buffers judged by said judging operation to satisfy the common retrieval conditions.

23. A computer program according to claim 22, wherein said retrieving step further comprises the step of:

transferring the set data from said output buffers so that processing can be performed in the set data.

* * * * *